US009656709B2

(12) United States Patent
O'Connell (10) Patent No.: US 9,656,709 B2
(45) Date of Patent: May 23, 2017

(54) SWING SCOOTER (71) Applicant: Yvolve Sports Ltd, Dublin (IE)

(72) Inventor: Thomas O'Connell, Castleblayney (IE)

(73) Assignee: YVOLVE SPORTS LTD., Dublin (IE)

( * ) Notice: Subject to any disclaimer, the term of this patent is extended or adjusted under 35 U.S.C. 154(b) by 0 days.

(21) Appl. No.: 14/317,259

(22) Filed: Jun. 27, 2014

(65) Prior Publication Data
US 2015/0266530 A1 Sep. 24, 2015

(30) Foreign Application Priority Data

Mar. 19, 2014 (CN) .......................... 2014 1 0103393

(51) Int. Cl.
| A63C 17/26 | (2006.01) |
|---|---|
| A63C 17/00 | (2006.01) |
| B62K 15/00 | (2006.01) |
| B62K 3/00 | (2006.01) |
| B62H 1/12 | (2006.01) |
| B62K 17/00 | (2006.01) |

(52) U.S. Cl.
CPC ............. B62H 1/12 (2013.01); A63C 17/004 (2013.01); A63C 17/26 (2013.01); A63C 17/265 (2013.01); B62K 3/002 (2013.01); B62K 15/006 (2013.01); B62K 17/00 (2013.01)

(58) Field of Classification Search
CPC ............ A63B 22/0061; A63B 69/0093; A63C 17/004; A63C 17/26; A63C 17/265; A63C 17/01; B62K 15/006; B62K 3/002
See application file for complete search history.

(56) References Cited

U.S. PATENT DOCUMENTS

| 4,095,817 A | | 6/1978 | Cohen | |
|---|---|---|---|---|
| 4,183,547 A | | 1/1980 | Cohen et al. | |
| 5,039,121 A | * | 8/1991 | Holter | B62K 5/02 |
| | | | | 280/220 |
| 5,090,716 A | * | 2/1992 | Borden | 280/87.042 |

(Continued)

FOREIGN PATENT DOCUMENTS

| CN | 203427957 U | 2/2014 |
|---|---|---|
| CN | 203727548 U | 7/2014 |

(Continued)

OTHER PUBLICATIONS

CN 2014101033939, Office action search report, Chinese State Intellectual Property Office, Nov. 10, 2016.

*Primary Examiner* — Joseph Rocca
*Assistant Examiner* — Daniel Yeagley
(74) *Attorney, Agent, or Firm* — Millman IP Inc.

(57) ABSTRACT

A swing scooter includes a frame, a riser bar, a handlebar, a front wheel, at least two carrier rods, a flexible linking mechanism, at least two rear wheels, at least two pedals, at least two auxiliary wheels and at least two swinging modules. The auxiliary wheels are installed at the rear of the rear wheels. When the front wheel and the rear wheels touch the ground, the auxiliary wheels are situated at an appropriate height from the ground, and the swinging module is coupled between the carrier rods and the rear wheels. During use, the front and rear wheels situated at the general using status touch the ground, or the front of the scooter is tilted, such that the rear wheels and the auxiliary wheels touch the ground to add more fun to the use of the scooter.

9 Claims, 8 Drawing Sheets (56) References Cited

U.S. PATENT DOCUMENTS

| | | |
|---|---|---|
| 6,250,656 B1 | 6/2001 | Ibarra |
| D446,260 S | 8/2001 | Bang |
| D446,555 S | 8/2001 | Bang |
| D453,198 S | 1/2002 | Dudley |
| 6,367,828 B1 | 4/2002 | Mandic |
| 6,378,642 B1 * | 4/2002 | Sutton .................... B62D 61/08 180/208 |
| 6,386,562 B1 | 5/2002 | Kuo |
| 6,485,039 B1 * | 11/2002 | Ming-Fu ................ B62K 3/002 280/282 |
| 6,619,678 B2 | 9/2003 | van Ardenne |
| D486,532 S | 2/2004 | Christianson |
| 6,715,779 B2 | 4/2004 | Eschenbach |
| 6,739,606 B2 * | 5/2004 | Rappaport ............ B62K 3/002 280/87.041 |
| 7,549,655 B2 | 6/2009 | Fan |
| 7,597,334 B2 * | 10/2009 | Chen ....................... 280/87.041 |
| D606,610 S | 12/2009 | Sramek et al. |
| 8,205,895 B2 * | 6/2012 | Chen .................... B62K 3/002 280/87.01 |
| 8,387,996 B2 | 3/2013 | Marcel |
| 8,870,200 B2 | 10/2014 | Chen |
| 9,079,627 B1 * | 7/2015 | Ibon ...................... B62K 3/002 |
| 2002/0096849 A1 * | 7/2002 | Bang ....................... 280/87.041 |
| 2003/0024752 A1 | 2/2003 | Mayer et al. |
| 2005/0093261 A1 * | 5/2005 | Liao et al. ............... 280/87.041 |
| 2007/0170666 A1 * | 7/2007 | Chen ......................... 280/1.181 |
| 2007/0170686 A1 | 7/2007 | Chen |
| 2008/0179849 A1 * | 7/2008 | Fan .......................... 280/87.041 |
| 2010/0234186 A1 * | 9/2010 | Fan ................................ 482/51 |
| 2011/0089656 A1 * | 4/2011 | Chiu ..................... B62K 3/002 280/87.041 |
| 2011/0298193 A1 * | 12/2011 | Fan .............................. 280/221 |
| 2012/0043733 A1 * | 2/2012 | Tsai ...................... B62K 3/002 280/87.05 |

FOREIGN PATENT DOCUMENTS

| | | | |
|---|---|---|---|
| FR | 2990185 A1 * | 11/2013 | ............. B62K 3/002 |
| IT | WO 0202394 A1 * | 1/2002 | ............. B62K 3/002 |

* cited by examiner

SWING SCOOTER

FIELD OF THE INVENTION

The present invention relates to a swing scooter, in particular the swing scooter that provides fancy applications in additional to the general application.

BACKGROUND OF THE INVENTION

In general, a three-wheel scooter includes a handlebar riser and a pair of body brackets, wherein a handlebar is installed at the top of the handlebar riser, and a front wheel is installed at the bottom of the handlebar riser, and the ends of the body brackets have left and right rear wheels respectively, so that a user can pedal the left and right pedals by both legs, and swing the user's body to the left and the right in order to drive the scooter to move forward. Wherein, the front wheel and the left and right rear wheels constitute a three-point contact with the ground to allow users to pedal on the left and right pedals stably, twist the handlebar or move their body to the left and right to swing the handlebar riser to the left and right, and apply force on the left and right pedals by pedaling in order to drive the front wheel to roll forward in an S-shaped path and achieve the effect of moving forward.

Regardless of the type of conventional scooters, the conventional scooters can only be used by attaching the front and rear wheels flatly onto the ground to slide forward, but do not provide other using methods. Since the characteristic of the scooter has been changed gradually from transportation means into recreational sports equipment, and exercisers like innovative ideas and try different games, therefore the conventional scooters no longer can meet the exercisers' requirements.

In view of the problems above, the inventor of the present invention based on years of experience in the related industry to conduct extensive researches and experiments, and finally developed an improved swing scooter in accordance with the present invention to overcome the foregoing problems.

SUMMARY OF THE INVENTION

Therefore, it is a primary objective of the present invention to provide an improved swing scooter that provides fancy applications in additional to the general application.

To achieve the aforementioned objective, the present invention provides a swing scooter comprising a frame, a riser bar, a handlebar, a front wheel, at least two carrier rods, a flexible linking mechanism, at least two rear wheels, at least two pedals, at least two auxiliary wheels and at least two swinging modules, wherein the riser bar, handlebar and front wheel are combined to the front end of the frame, and the flexible linking mechanism is coupled between the riser bar and the carrier rods to provide a swing torque of the carrier rods, and the rear wheel is installed at a position proximate to the rear end of the carrier rods, and the pedals are installed on the carrier rods respectively, and the auxiliary wheels are installed at the rear of the rear wheels respectively, and when the front wheel and the rear wheel touch the ground, the auxiliary wheel is situated at an appropriate height from the ground, and the swinging module is coupled between the carrier rod and the rear wheel.

During use, the front and rear wheels are situated at a general using status to touch the ground, or the front end of the scooter is tilted, so that the rear wheel and the auxiliary wheel touch the ground, or further a limit action such as a "bunny hop" can be performed to add more fun to the use of the scooter.

DESCRIPTION OF THE PREFERRED EMBODIMENTS

The aforementioned and other objectives and advantages of the present invention will become clearer in light of the following detailed description of an illustrative embodiment of this invention described in connection with the drawings. It is intended that the embodiments and drawings disclosed herein are to be considered illustrative rather than restrictive.

Figure 1:
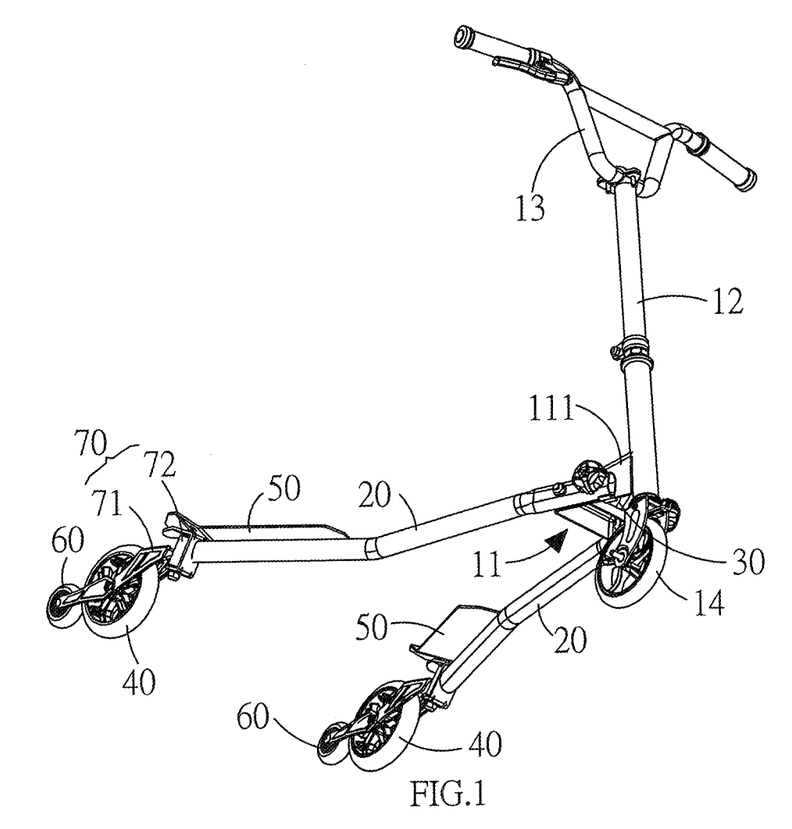
FIG. 1 is a perspective view of a scooter of the present invention.
Figure 2:
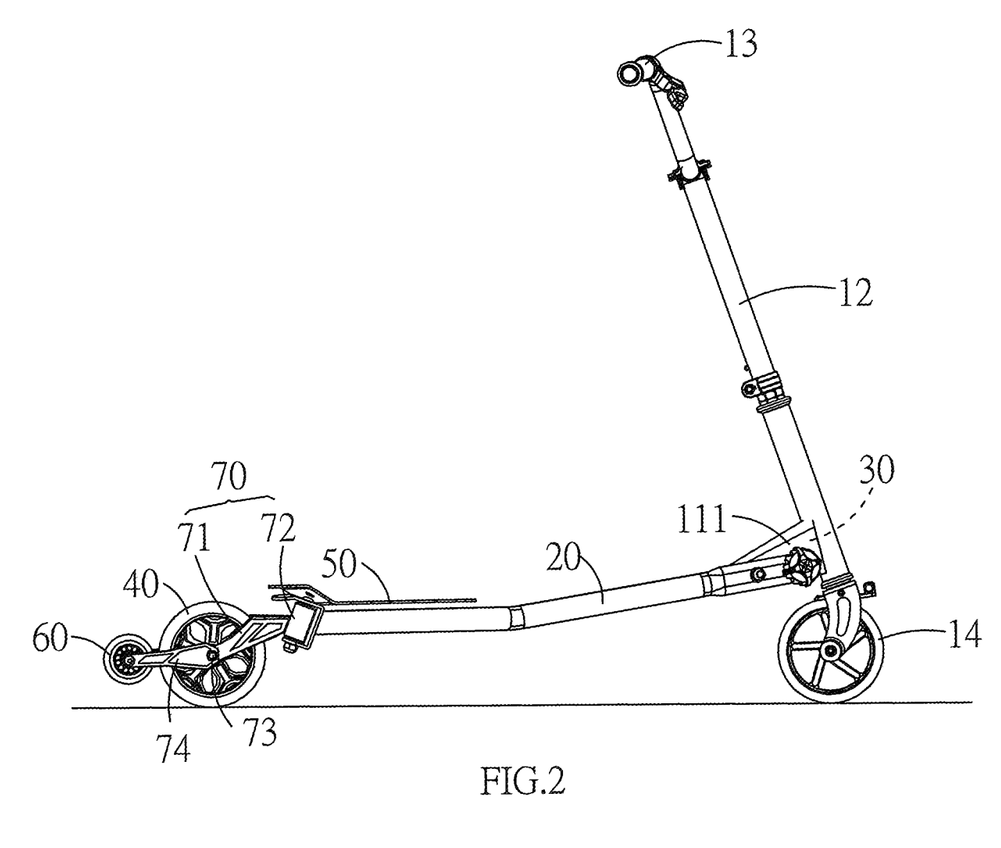
FIG. 2 is a schematic view of a scooter of the present invention.

With reference to FIGS. 1 and 2 for the perspective view and schematic view of the structure of a swing scooter of the present invention respectively, the swing scooter comprises a frame 11, a riser bar 12, a handlebar 13, a front wheel 14, at least two carrier rods 20, a flexible linking mechanism 30, at least two rear wheels 40, at least two pedals 50, at least two auxiliary wheels 60 and at least two swinging modules 70. In this embodiment, two carrier rods 20, two rear wheels 40, two pedals 50, two auxiliary wheels 60 and two swinging modules 70 are used as an example for illustrating the present invention.

The riser bar 12 is installed on the frame 11, and the handlebar 13 is installed at the top end of the riser bar 12, and the front wheel 14 is installed at the bottom end of the riser bar 12, and the front ends of the two carrier rods 20 are combined to the frame 11, and the flexible linking mechanism 30 is coupled between the riser bar 12 and the two carrier rods 20 to provide a swing torque of the two carrier rods 20. Wherein, the frame 11 includes a main body 111 (which is in a triangular shape as shown in the figures), and the riser bar 12 is installed on the main body 111, and the front ends of the two carrier rods 20 are respectively and pivotally installed on both left and right sides of the main body 111, and the flexible linking mechanism 30 is combined between the riser bar 12 and the carrier rods 20 to provide a swing torque of the carrier rods 20. The flexible linking mechanism may be a flexible member (not shown in the figures) and is capable of providing a swing, elastic or flexible action, and the flexible member is comprising fiberglass, soft metal or polyurethane to provide a swing torque of the left and right carrier rods.

Figure 3:
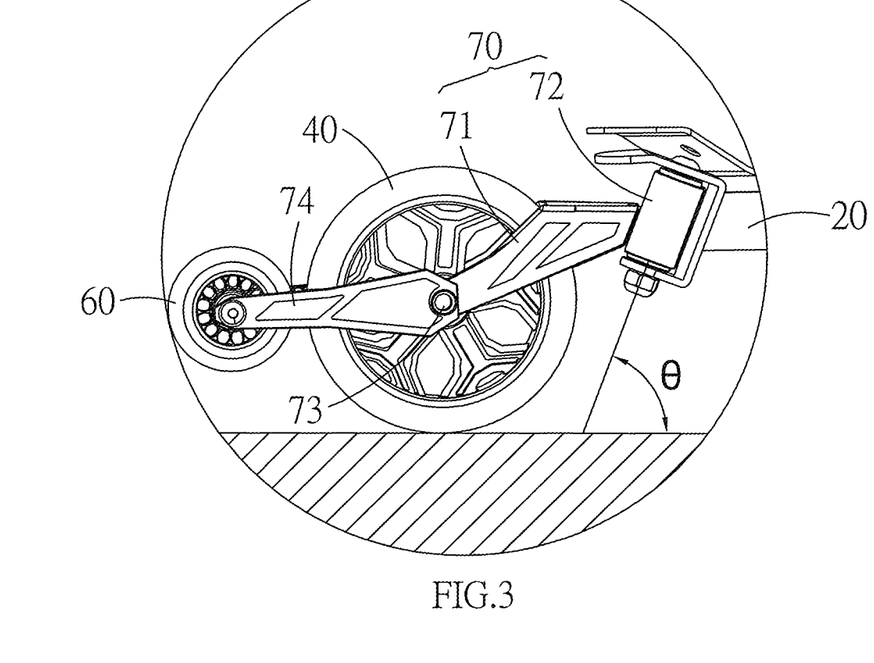
FIG. 3 is a blowup view of the structure of a rear wheel and an auxiliary wheel of a scooter of the present invention.

The two rear wheels 40 are installed at positions proximate to the rear end of the carrier rods 20 respectively, and the two pedals 50 are installed at the top positions of the carrier rod 20 respectively. The two swinging modules 70 are coupled between the carrier rod 20 and the rear wheel 40. In FIG. 3, the swinging module 70 includes a rear fork 71 and a pivot 72, and the rear wheel 40 is pivotally installed to the carrier rods 20 in a bias form through the rear fork 71 and the pivot 72, and the pivot 72 is pivotally installed to the carrier rod 20 in a tilted form, so that the two rear wheels 40 can be swung freely to produce sideway swings. To provide a good and smooth automatic guiding effect of the rear wheel 40, the pivot 72 is pivotally installed to the carrier rod 20 and tilted with respect to the carrier rod 20 with an angle θ, preferably 65-70 degrees.

The at least two auxiliary wheels 60 are installed at the rear of the rear wheel 40, such that when the front wheel 14 and the rear wheels 40 touch the ground, the auxiliary wheels 60 are situated at an appropriate height from the ground. Wherein the rear fork 71 of the swinging module has an end coupled to the other end of the pivot 72 and a rear wheel shaft combining portion 73 formed at the other end of the rear fork 71 to connect the rear wheel 40, and the rear wheel shaft combining portion 73 of the rear fork is further coupled to a connecting member 74, and the other end of the connecting member 74 is pivotally installed at the axis of the auxiliary wheel 60, so that the auxiliary wheel 60 is installed at the rear of the rear wheel 40.

Figure 4:
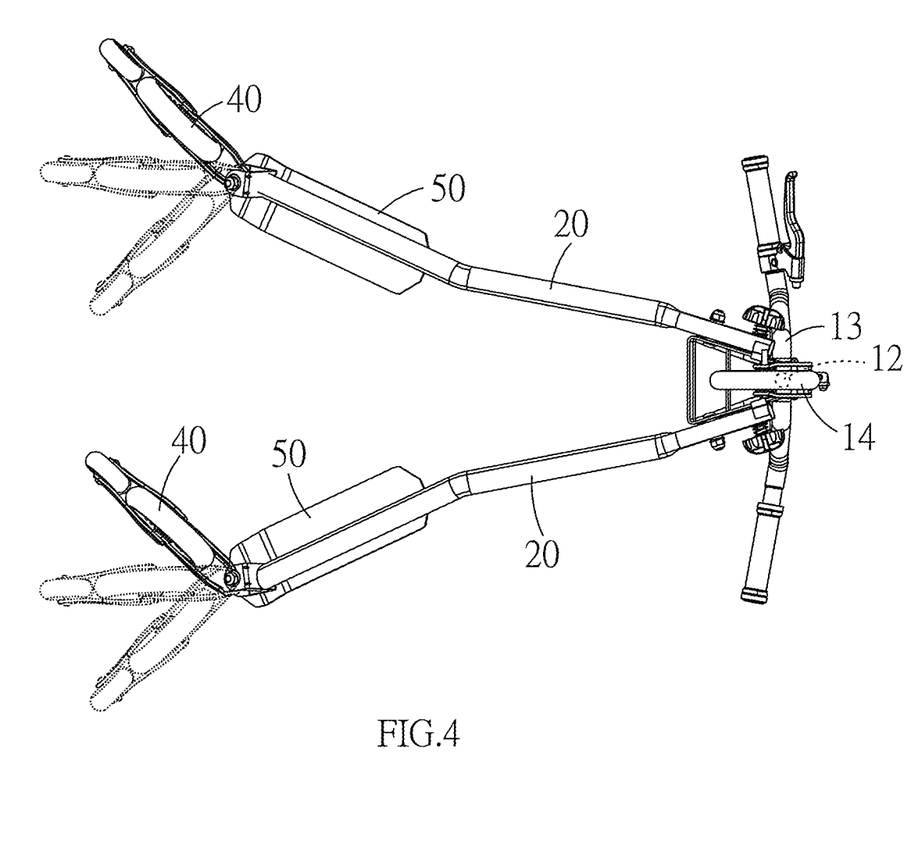
FIG. 4 is a schematic view of using a scooter of the present invention.

In an application as shown in FIG. 4, a user applies forces onto the pedals 50 installed onto the carrier rods 20 by both legs respectively and grips the handlebar 13 by both hands, and then applies a force to swing the handlebar 13 sideway, and pedals the two pedals 50 in order to swing the front wheel 14 to the left and right, and two rear wheels 40 will move forward in an S-shaped path during the left and right swings. During the joint operation of the front wheel 14, riser bar 12 and handlebar 13, the users twist their body, hips, arms, hands and legs alternately or synchronously to drive the scooter. Obviously, the scooter provides a simple and easy operation as well as the recreational and fun effects.

Figure 5:
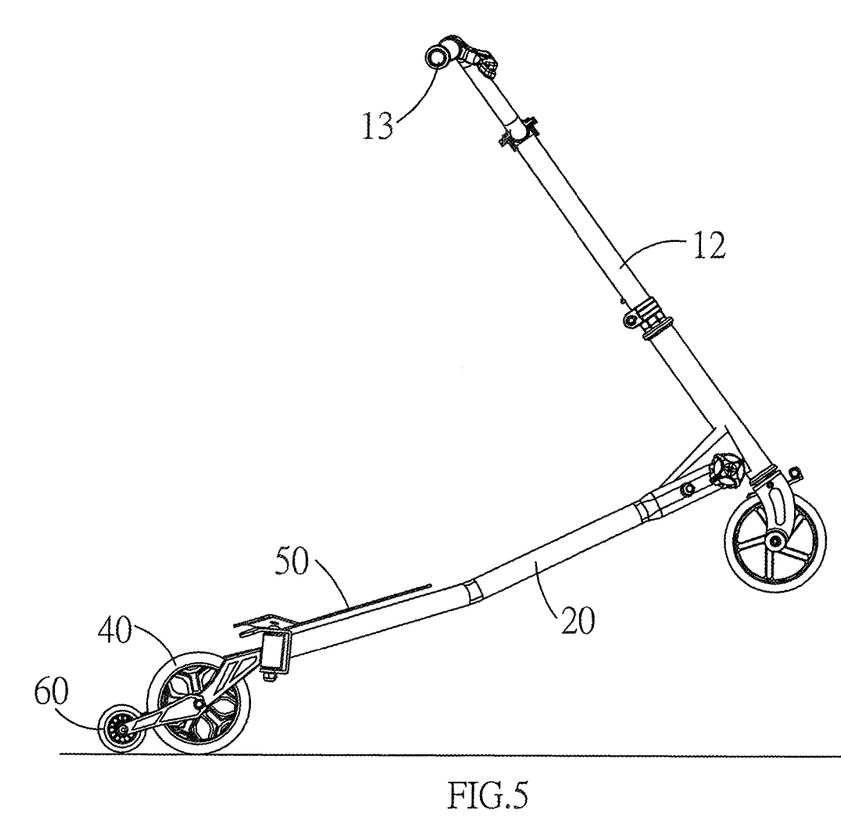
FIG. 5 is another schematic view of using a scooter of the present invention.

In addition to the aforementioned general using status, the scooter may also be used for a fancy application as shown in FIG. 5. Users may pedal on the pedals 50 installed on the carrier rods 20, and tilt the front end of the scooter upward. Now, the front wheel 14 leaves the ground, while the rear wheels 40 and auxiliary wheels 60 of the scooter are touching the ground. Therefore, the scooter can be used in a fancier way than the general using status, such as touching the ground by the rear wheels and auxiliary wheels to slide the scooter.

Figure 6:
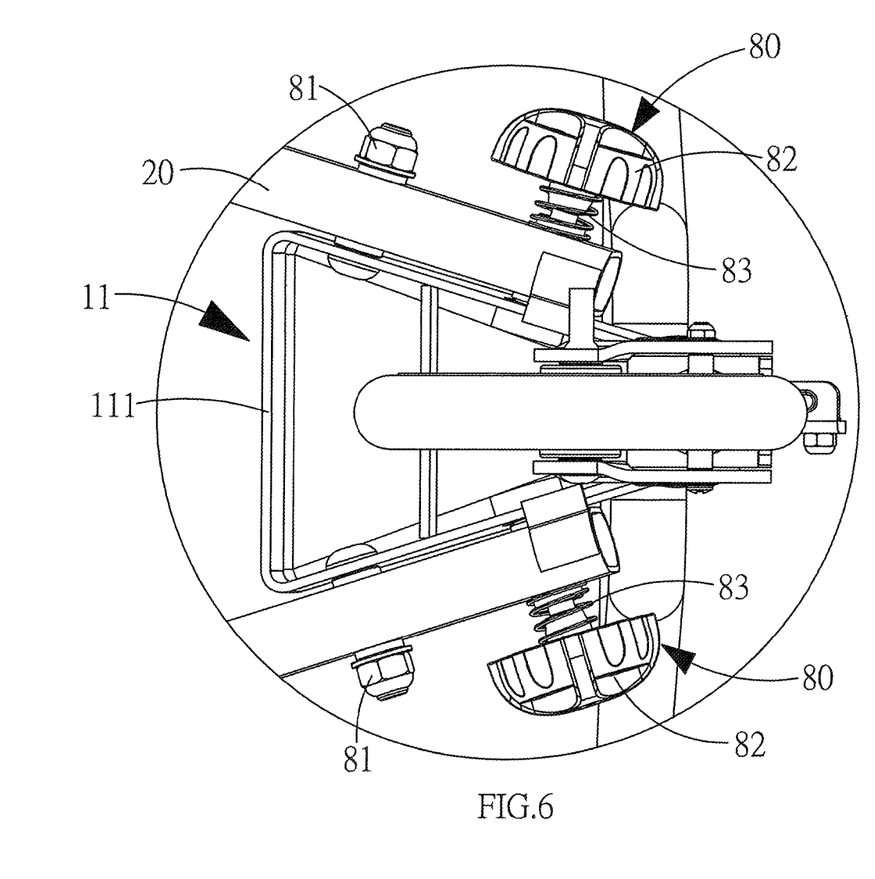
FIG. 6 is a blowup view of a folding mechanism of the present invention.
Figure 7:
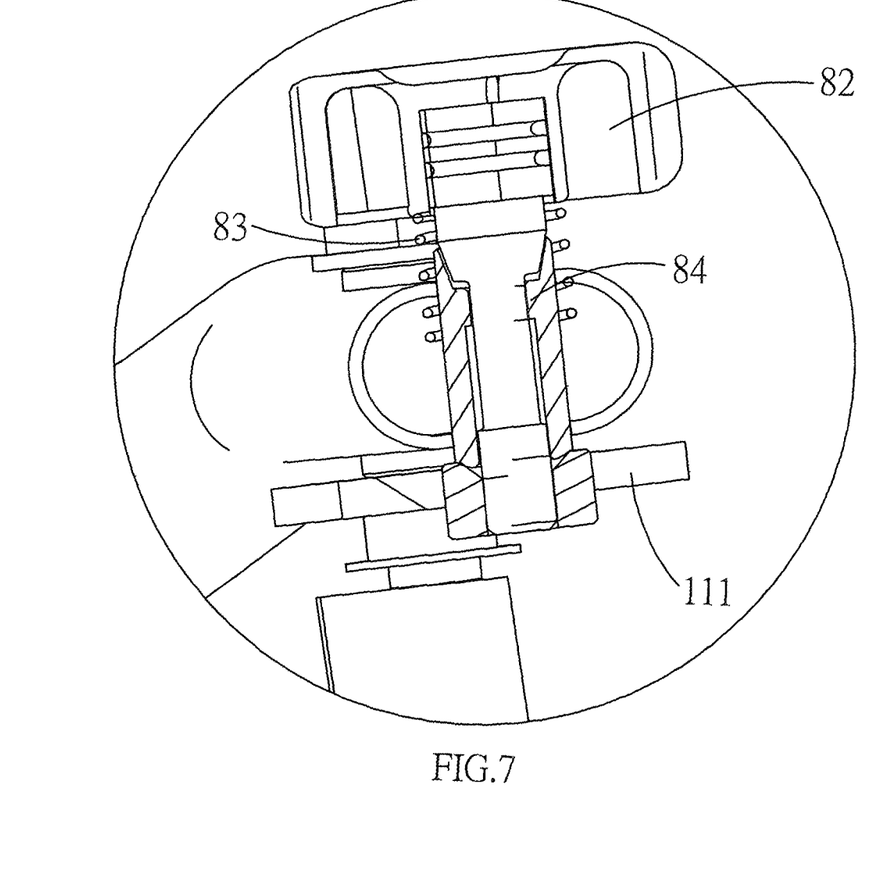
FIG. 7 is another blowup view of a folding mechanism of the present invention viewing from a different angle.
Figure 8:
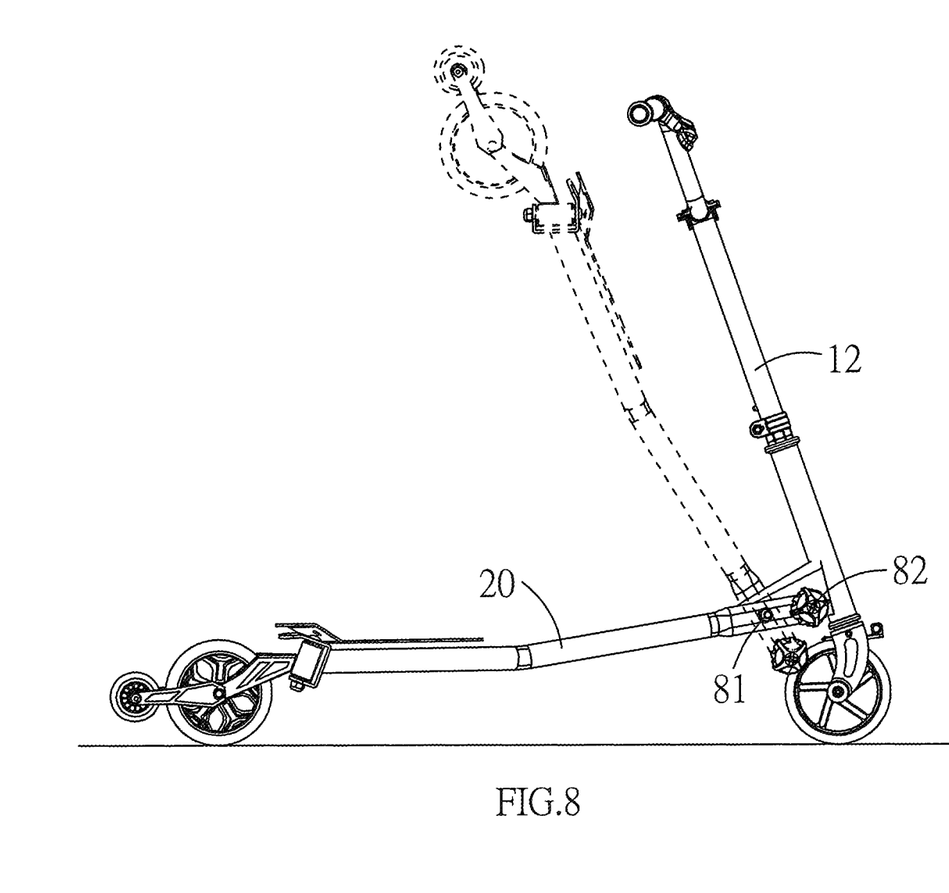
FIG. 8 is schematic view of a folded scooter of the present invention.

In FIGS. 6 and 7, the swing scooter of the present invention further comprises a folding mechanism 80 installed between the frame 11 and the carrier rods 20 for folding the carrier rods 20. Wherein, the folding mechanism 80 comprises a pintle 81, an adjusting element 82 and an elastic element 83, and the pintle 81 is pivotally installed between the main body 111 of the frame 11 and the carrier rods 20, and the adjusting element 82 is disposed at the front end of the pintle 81, and the adjusting element 82 locks the carrier rods 20 onto the main body 111 of the frame, and the elastic element 83 is sheathed on the adjusting element 82 for providing an action force to normally move the adjusting element 81 outward. In an unfolding process, the adjusting element 82 is separated from the locking of the frame 11, and an action force of the elastic element 83 is used to move the adjusting element 82 outward. Now, each carrier rod 20 and the frame 11 are connected by the pintle 81 only, so that each carrier rod 20 can be turned easily. In FIG. 8, the volume of the scooter can be reduced significantly to achieve the effects of convenient folding and storage when the adjusting element 82 is moved in a parallel direction towards the riser bar 12.

In addition, the folding mechanism further includes a stop member 84 disposed in the carrier rod 20 and opposite to the axial position of the adjusting element 82, such that when the adjusting element 82 is moved to the outside, the adjusting element 82 is latched by the stop member 84 to prevent it from being separated from the carrier rod 20 completely.

In summation of the above description, the present invention herein enhances the performance than the conventional structure and further complies with the patent application requirements and is duly submitted for patent application. While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A swing scooter, comprising:
   a frame;
   a riser bar, installed on the frame;
   a handlebar, installed at a top end of the riser bar;
   a front wheel, installed at a bottom end of the riser bar;
   at least two carrier rods, each carrier rod having a front pivotally connected with the frame;
   at least two rear forks wherein each of the rear forks is pivotally mounted proximate to a rear end of an associated one of the carrier rods respectively, and wherein each rear fork supports a rear wheel;
   at least two pedals, each pedal installed on an associated one of the carrier rods respectively;
   at least two auxiliary wheels, wherein each auxiliary wheel is supported on a connecting member that is connected at a rear of an associated one of the rear wheels to an associated one of the rear forks, and wherein the two auxiliary wheels are situated at a height from the ground when the front wheel and the rear wheels touch the ground,
   wherein the auxiliary wheels are fixedly connected to the rear forks in such a way that, when a user applies force on the pedals and tilts the front wheel upward off the ground, the rear wheels and the auxiliary wheels support the swing scooter on the ground; at least two swinging modules, each swinging module being coupled and installed between one of the carrier rods and one of the rear wheels, wherein each swinging module includes the respective, one of the rear forks and a pivot, wherein each of the rear wheels is pivotally installed to the respective one of the carrier rods in a positive caster effect through the respective one of the rear forks and the associated pivot; wherein each of the auxiliary wheels is coupled rearwardly of the associated one of the rear forks and extending rearwardly from the respective swinging module to swingably pivot along with the associated rear wheel being pivoted about the respective pivot of the associated one of the carrier rods respectively.

2. The swing scooter of claim 1, wherein the pivot of each swinging module is pivotally installed to said one of the carrier rods in a tilted form.

3. The swing scooter of claim 1, further comprising a flexible linking mechanism, coupled between the riser bar and the carrier rods, for providing a swing torque of the carrier rods, wherein the flexible linking mechanism is a flexible member.

4. The swing scooter of claim 3, wherein the flexible member is comprising fiberglass.

5. The swing scooter of claim 3, wherein the flexible member is comprising soft metal.

6. The swing scooter of claim 3, wherein the flexible member is comprising polyurethane.

7. The swing scooter of claim 1, further comprising a folding mechanism installed between the frame and the carrier rods for folding the carrier rods.

8. The swing scooter of claim 7, wherein the folding mechanism includes a pintle, an adjusting element and an elastic element, and the pintle is pivotally installed between the frame and the carrier rod, and the adjusting element is disposed at a front end of the pintle, and the adjusting element is provided for locking the carrier rods onto the frame, and the elastic element is sheathed on the adjusting element for providing an action force to normally move the adjusting element towards an outside.

9. The swing scooter of claim 8, wherein the folding mechanism further has a stop member disposed in the carrier rod and at a position opposite to an axial position of the adjusting element, so that when the adjusting element moves towards the outside, the adjusting element is latched by the stop member to prevent the adjusting element from separating from the carrier rod.

* * * * *